(12) United States Patent
Amicangioli

(10) Patent No.: US 10,489,857 B2
(45) Date of Patent: *Nov. 26, 2019

(54) DATA CAPTURE AND REAL TIME RISK CONTROLS FOR ELECTRONIC MARKETS

(71) Applicant: Hyannis Port Research, Inc.

(72) Inventor: Anthony D. Amicangioli, Newton, MA (US)

(73) Assignee: Hyannis Port Research, Inc., Needham, MA (US)

( * ) Notice: Subject to any disclaimer, the term of this patent is extended or adjusted under 35 U.S.C. 154(b) by 319 days.

This patent is subject to a terminal disclaimer.

(21) Appl. No.: 15/444,918

(22) Filed: Feb. 28, 2017

(65) Prior Publication Data

US 2017/0236203 A1    Aug. 17, 2017

Related U.S. Application Data

(63) Continuation of application No. 13/335,064, filed on Dec. 22, 2011, now Pat. No. 9,607,337.

(60) Provisional application No. 61/426,118, filed on Dec. 22, 2010.

(51) Int. Cl.

| | |
|---|---|
| *G06Q 40/04* | (2012.01) |
| *G06Q 10/06* | (2012.01) |
| *G06F 11/07* | (2006.01) |
| *H04L 12/54* | (2013.01) |
| *H04L 12/947* | (2013.01) |
| *H04L 29/06* | (2006.01) |

(52) U.S. Cl.
CPC ........... *G06Q 40/04* (2013.01); *G06F 11/079* (2013.01); *G06F 11/0709* (2013.01); *G06Q 10/0635* (2013.01); *H04L 12/56* (2013.01); *H04L 49/251* (2013.01); *H04L 63/0245* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 5,926,473 A | 7/1999 | Gridley | |
| 6,327,242 B1 | 12/2001 | Amicangioli et al. | |
| 6,522,656 B1 | 2/2003 | Gridley | |
| 6,535,509 B2 | 3/2003 | Amicangioli et al. | |
| 7,224,669 B2 | 5/2007 | Kagan et al. | |
| 7,230,947 B1 | 6/2007 | Huber et al. | |
| 7,636,703 B2 | 12/2009 | Taylor | |
| 7,640,208 B2 | 12/2009 | Grossman | |
| 7,640,298 B2 | 12/2009 | Berg | |
| 7,680,718 B2 | 3/2010 | Brandes et al. | |
| 7,827,087 B2 | 11/2010 | Adatia et al. | |

(Continued)

OTHER PUBLICATIONS

Cut-Through and Store-and-Forward Ethernet Switching for Low-Latency Environments, Cisco Systems, Inc., 2008.*

(Continued)

*Primary Examiner* — Olabode Akintola
(74) *Attorney, Agent, or Firm* — David J. Thibodeau, Jr.; VLP Law Group LLP

(57) ABSTRACT

A distributed, transparent, in-line risk management and traffic capture system that solves securities trading compliance problems. A transparent cut-through sniffer device is coupled with a real-time packet processor to police traffic flows between trading clients and exchange servers.

20 Claims, 14 Drawing Sheets

(56) References Cited

U.S. PATENT DOCUMENTS

| | | | |
|---|---|---|---|
| 7,840,481 B2 | 11/2010 | Aloe et al. | |
| 7,873,560 B2 | 1/2011 | Reich et al. | |
| 7,921,046 B2 | 4/2011 | Parsons et al. | |
| 8,014,274 B1 | 9/2011 | Amicangioli et al. | |
| 2002/0156721 A1* | 10/2002 | Lyback | G06Q 30/08 |
| | | | 705/37 |
| 2004/0236888 A1 | 11/2004 | Dieffenderfer et al. | |
| 2008/0243675 A1 | 10/2008 | Parsons et al. | |
| 2009/0157452 A1 | 6/2009 | Arora et al. | |
| 2009/0287628 A1 | 11/2009 | Indeck et al. | |
| 2010/0082474 A1 | 4/2010 | Beaumont | |
| 2010/0094743 A1* | 4/2010 | Robertson | G06Q 40/00 |
| | | | 705/37 |
| 2010/0174770 A1* | 7/2010 | Pandya | G06F 17/30985 |
| | | | 709/200 |
| 2011/0016221 A1 | 1/2011 | Amicangioli et al. | |
| 2012/0130919 A1* | 5/2012 | Gaber | G06Q 40/04 |
| | | | 705/36 R |

OTHER PUBLICATIONS

Market Access: Will a Naked Access Ban Raise Costs? (Rules & Regs), Traders, James Ramage, May 3, 2010.*
Corrected International Search Report and Written Opinion dated May 15, 2013 for International Application No. PCT/US11/66882 filed on Dec. 22, 2011 as Data Capture and Real Time Risk Controls for Electronic Markets by Anthony D. Amicangioli, 15 pages.
Stevens, W. Richard, *TCP/IP Illustrated, vol. 1 The Protocols*, Addison-Wesley, Reading MA, 1994, pp. 1-7 and 2223-2228.
"Data Link Layer", www.wikipedia.org (Jul. 15, 2015).
European Search Report dated Apr. 14, 2014 for European Application No. 11849979.7, 6 pages.

* cited by examiner

| 15C3-5 REQUIREMENT | SLOW PATH PROCESSING | FAST PATH PROCESSING |
|---|---|---|
| DISTRIBUTED CREDIT-LIMIT/BUYING POWER TRACKING | Y | |
| CONCENTRATION LIMITS | Y | |
| RESTRICTED STOCK DISABLE | | Y |
| REGULATION SHO - SHORT SALE TEST | | Y |
| CLEARLY ERRONEOUS | | Y |
| "FAT FINGER" TEST. PER ACCOUNT LIMITS | Y | |
| REPEAT ORDER - ORDER FREQUENCY | Y | |
| EXPOSURE TEST | Y | |
| BROKER ACCOUNT OR SESSION DISABLE | | Y |

FIG. 11

DATA CAPTURE AND REAL TIME RISK CONTROLS FOR ELECTRONIC MARKETS

RELATED APPLICATION(S)

This application is a continuation of U.S. patent application Ser. No. 13/335,064 filed on Dec. 22, 2011 by Anthony D. Amicangioli entitled "Data Capture and Real Time Risk Controls for Electronic Markets" which claims the benefit of U.S. Provisional Application No. 61/426,118, filed on Dec. 22, 2010 entitled "System and Method for Data Capture and Real Time and Risk Controls for Electronic Markets." The entire teachings of the above applications are incorporated herein by reference.

BACKGROUND

The United States' Securities and Exchange Commission (SEC) passed Regulation 15C3-5 on Nov. 11, 2010 outlawing unfiltered access to securities markets. Without such a rule, high frequency traders are otherwise allowed to connect algorithmic trading systems directly to exchanges with no in-line monitoring or filtering by the sponsoring broker. This means that traders were able to buy and sell securities electronically with absolutely no Real-Time oversight, exposing the market to disruptions.

Moreover, sponsoring brokerages are individually exposed as they receive either drop copy summaries with no control before orders are sent or they receive end of day summaries long after a terrible event has occurred. A drop-copy port is a connection that a broker can utilize to provide a stream of event updates to the sponsoring broker.

Compounding the problem is the fact that these high frequency traders are typically using a single brokerage account while trading at numerous liquidity destinations. The advent of co-location services allows traders install their systems in liquidity destination data centers. A single client trading system is usually a collection of servers scattered across geographically separated destinations. These distributed trading systems increase the difficulty for a broker who wishes to impose strict controls on trader behavior.

SUMMARY

Specialized components of a data processing system, or software processes executing on the same, and particular combinations of components and software, process trade information to provide a distributed, transparent, in-line, risk management and traffic capture system that solves certain regulatory compliance and other problems. Aspects that are believed to be important include:
Transparent—Invisible to adjacent devices.
Real-Time—Provides the lowest possible latency utilizing a cut-through paradigm.
Minimally invasive—No or minimal action required by trading clients on installation.
Alternative Data Capture (Exchange Drop Copy) Service—Performance gains through reduced load on exchange matching engine and better (unified) control of capture data for brokerages.
Superior support for SEC Regulation 15C3-5 with better security and "Direct and Exclusive Control" broker control.
Distributed—Provides a distributed system capable of synchronizing systems at multiple exchanges.

In a preferred implementation, the system utilizes a transparent sniffer (high performance cut-through) coupled with Real-Time packet processing. The design is capable of through device latencies of less then 500 nanoseconds in the client to market direction, while providing lower latencies in the reverse direction.

The system achieves this high performance because it does not terminate connections (such as TCP/IP connections) or store and forward traffic packets. The sniffer instead inspects traffic in a cut-through topology while maintaining a Real-Time approach to exception processing when faulty packets are detected.

The system includes the following major components:
POP Sniffer
Sniffer Module (SM) and POP Sniffer Server
Sniffer Module Field Programmable Gate Array (FPGA)/
    PIE (Packet Inspection Engine)
Risk Server (Central Server)
Risk Management Console
Remote Management Console and Command Line Interface (CLI)

The Point of Presence (POP) Sniffer polices the critical aspects of the traffic stopping poorly formed orders before they reach the exchange. This is achieved utilizing a powerful Packet Inspection Engine (PIE), implemented in low latency hardware such as a Field Programmable Gate Array (FPGA) to provide real-time policing for real time analysis of selected items such as high order quantity or high price.

Another aspect of the system provides real-time drop copy service to external or other adjacent risk management systems. Normally, drop copy data is collected from liquidity destinations; this is the de facto industry standard. However, this approach has its potential draw-backs. Liquidity destinations that integrate drop copy processing with their respective matching engines can impose a significant latency penalty when drop copy services utilize the same resources that the trading client uses. Merely activating a drop copy service can degrade performance as many if not most matching systems perform additional per-transaction work to support such traffic flows. The POP Sniffer utilizes integrated network tap technology and does not impose a performance penalty (exchanges and alternative trading systems).

More particularly, in preferred embodiments, a data processing system and/or method receives proposed transaction information concerning a requested transaction from one or more client machines via first port or interface. The transaction information is inspected to determine compliance with at least one transaction risk rule, and then sent to one or more exchange servers via a second port or interface. Significantly, the interfaces are coupled to one another through fixed cut-through logic and operate independently of one another.

The fixed cut-through logic is a two-port device that directly forwards transaction information received on the first port to the second port; does not terminate a communication connection with either the client machine or the exchange server; can begin sending part of the transaction information to the exchange server prior to receiving all of the information concerning the transaction from the client machine.

If the transaction would violate a rule, the transaction information can be altered before it is sent to the exchange server, such as by marking layer two error check fields to known erroneous values; causing the transaction to fail at the exchange server; or marking the transaction information in a way that makes it either harmless economically; or otherwise causing the exchange server to reject the requested transaction; or disrupting a communication flow between the client machine that originated the transaction information and the exchange server.

The cut-through device is located at a Point of Presence in both a first interface connecting to the client machine and a second interface connecting to the exchange server, and can bridge between the two.

In a preferred implementation, two or more transaction risk rules are defined as different rule types, with a first rule type requiring real time effort and a second rule type requiring best effort. Determining compliance with the first rule type is carried out in fixed logic and determining compliance with the second rule type is carried out in a programmable data processor. The fixed logic can be an FPGA or other hard-wired, low latency logic processor.

Examples of the first rule type include restricted stock, short sale, clearly erroneous trade, and per account quantity, price and value limit tests. Examples of the second rule type include distributed credit limit, concentration limit, repeat order, exposure, broker account and session disable tests. The first rule types can also comprise tests for equities, fixed income, futures, foreign exchange, options, or an instrument requiring Real-Time risk controls.

In certain embodiments, the Risk Management System can send a copy of the inspected transaction information via a third interface to another financial information processing system. The third interface can be a connection to a sponsoring broker for the requested transaction, and the step of sending a copy provides a stream of transaction event updates independent of the sponsoring broker. The third interface can also be a connection to a client device.

The Risk Management System may include various data processors and/or data handling functions. These include a transaction information inspection device that can take the form of two or more Point of Presence (POP) sniffers, disposed in-line between one or more client servers and one or more exchange servers, that provide packets including information concerning a trade requested by an independent broker or client of a sponsoring broker. The POP sniffer inspecting transaction packets for compliance with a first class of critical trading rules to be carried out in real time. The Risk Management System also includes a Risk (Central) Server, connected to receive transaction packets from the POP Sniffer and for inspecting the transaction packets for compliance with a second class of trading rules to be carried out on an asynchronous, Best Effort, basis. The Risk Management System also includes a risk management interface, for managing configuration of the Risk Server, and to provides direct control of trade risk by a sponsoring brokerage. Such a Risk Management System therefore provides a secure demarcation between the sponsoring broker's network and the trader-exchange network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 is a table of hardware and software processing allocation to rules.

DETAILED DESCRIPTION

Figure 1:
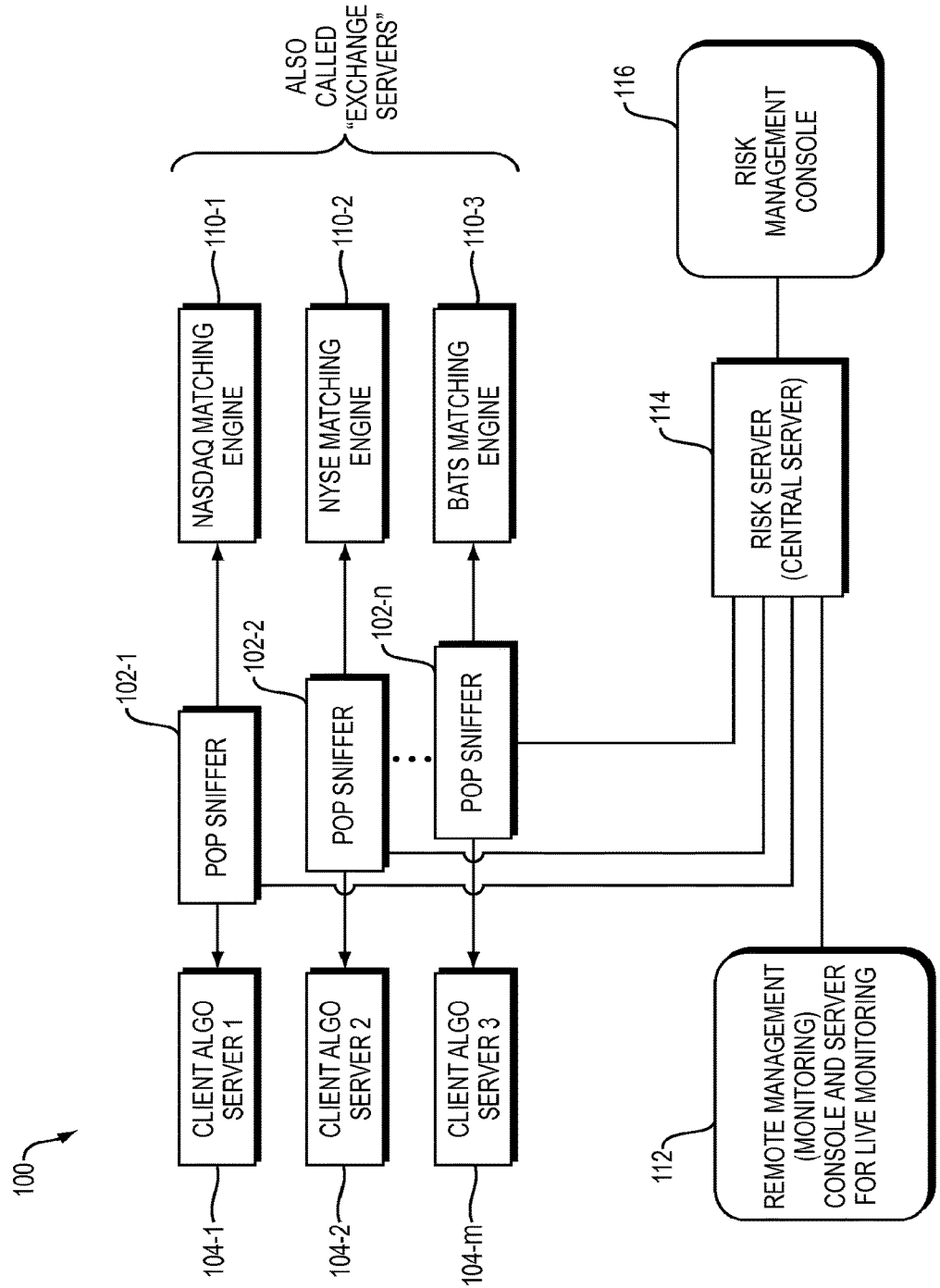
FIG. 1 is an overview of a Risk Management System.

A detailed description of example embodiments follows.

1. Introduction to the Risk Management System

This document provides a functional overview of one embodiment of a real time data capture and trading risk management system referred to herein as the so-called Risk Management System.

This first section describes i) the functionality provided by the Risk Management System, and ii) an overview of the requirements of one specific trading rule, SEC 15C3-5, and how critical aspects of those requirements are implemented by the technology in a specific way.

Problem Statement

The Securities and Exchange Commission passed Regulation 15C3-5 on Nov. 11, 2010 outlawing unfiltered access to markets. The new law is scheduled to go into effect on approximately one month, Jul. 14, 2011. Prior to the passing of the new rule, high frequency traders were allowed to connect algorithmic trading systems directly to exchanges with no in-line monitoring or filtering by the sponsoring broker. This means that traders were able to buy and sell securities electronically with absolutely no Real-Time oversight, exposing the market to disruptions. The fact that the May 6, 2010 "flash crash" caused a domino effect, causing market chaos, illustrates the need for such regulations and controls.

Moreover, sponsoring brokerages are individually exposed as they receive either drop copy summaries with no control before orders are sent or they receive end of day summaries long after a terrible event has occurred. A drop-copy port is a connection that a broker can make to a particular trading destination that provides a stream of event updates to the sponsoring broker.

Compounding the problem is the fact that these high frequency traders are typically using a single brokerage account while trading at numerous liquidity destinations. The advent of co-location services allows traders install their systems in liquidity destination data centers. A single client trading system is usually a collection of servers scattered across geographically separated destinations. These distributed trading systems increase the difficulty for a broker who wishes to impose strict controls on trader behavior.

Another key challenge is the ferocious appetite these traders have for low latency. In general, Latency is the time elapsed from the time an order to buy or sell a stock is sent to the time it actually arrives and is placed on a given exchange computer. Eight or nine years ago the best traders could dominate with systems that could process information in tens of milliseconds while the present state-of-the-art is in the tens of microseconds, representing a three order of magnitude advance. This means that a few microseconds of added delay can cost millions of dollars for the best traders.

And that makes creating a compelling technology that a trader is willing to place between an algorithmic system and the liquidity destination a very challenging proposition.

SEC Rule 15C3-5 Implementation

This section provides and outline of critical aspects of Securities and Exchange Commission ("SEC") rule 15C3-5, and a functional specification for how these rules are applied in the Risk Management System.

Real-Time vs. Best Effort/Asynchronous Tests.

Each 15C3-5 rule addressed can generally be characterized as either a "Real-Time" or "Best-Effort" (asynchronous) class of test. This is an important distinction to understand as it has a significant impact on how the system polices traffic.

A "Best Effort" test is, for example, a case where it is mathematically impossible to solve a problem in real time, forcing system designer's to rely on imposing intelligent heuristics to build a compliant system. Consider the following (simplified) example. A trader has $10,000.00 in buying power remaining; meaning that she can purchase that amount of stock before the system begins rejecting orders. However, the same trader has orders placed on multiple, geographically separated, exchanges (e.g., NASDAQ, NYSE, BATS) for the same amount. If that trader reaches their limit at all three exchanges at the same instant, it is impossible to propagate the information to stop orders instantaneously. A risk system can solve this problem a number of ways including dividing remaining credit by three and distributing that limit to each of the remote locations, or use a "low water mark" heuristic to predict account exhaustion and disable the account early. The point here is not to propose "how" such problems are solved; it is more important to note that they exist and do not have exact solutions.

Real-Time tests are therefore those tests defined by the regulation that can and must be solved in real time. These are typically simple in nature. Consider the case where a given trader's account has had a particular symbol disabled, e.g., MSFT, for compliance reasons. If that trader sends an order for that particular stock it must be stopped before it reaches the market.

The SEC regulation also imposes a number of requirements to which a sponsoring broker must adhere to continue providing services to high frequency traders. The following list provides an overview of the regulation by listing the tests that a compliant system must perform. We also describe whether such tests are Real-Time or Best-Effort in the preferred implementation.

a) Distributed Credit-Limit/Buying Power Tracking. Best Effort.

The SEC rule stipulates that sponsoring brokers must track traders activity to ensure that they do not exceed trading account Credit Limits. At the start of each trading day, a trading account is seeded with a maximum number of dollars that a trader can spend. As traders increase their inventory, this number is consumed. Once the limit is reached, the risk management system must stop any orders/trades that would allow the trader to exceed the imposed limit.

This is characterized as a best-effort class test as it is impossible for a central risk management system to resolve the exact financial value of purchased stocks across geographically distributed systems. It is not difficult to solve in practice however. There are numerous ways to solve this as credit limits are rarely exceeded and typical trade sizes are extremely small with respect to this number.

b) Concentration Limits—Tests. Best Effort

If a trader purchases an excessive amount of one particular stock they are said to have a high concentration in that particular security. This is a metric that will vary from trader to trader as some strategies rely on high concentrations of a single security, while others do not. Hence, while concentration limits are imposed by rule 15C3-5 they rely on the sponsoring brokers discretion, and all such metrics are set on a risk management application.

Concentration tests are Best Effort in nature as stock purchases occur at geographically separated exchanges and the information must be synchronized as information propagates between the sites.

c) Restricted Stock Disable. Real-Time

SEC 15C3-5 imposes a test for restricted securities. Restricted Stock tests describe cases where a compliance/risk department disables a particular stock for a particular client. Consider the case where a trader has inside information on a company and is consequently forbidden to trade the stock. Restricted stocks are listed for each account on the risk management system. Once entered, the Real-Time risk system must prevent any orders for that stock from reaching the market.

This test is Real-Time in nature as it is possible to distribute a restricted list of securities to each trading site where the equipment can impose this test in real time.

d) Regulation SHO—Short Sale Tests. Real-Time & Best Effort

Selling short means a trader is selling a stock that they do not own yielding an inventory that is a negative number. Being "short" 100 shares of Cisco really means you de facto borrow the stock as allowed by your broker. To do so, the broker must locate the stock to loan the trader or all such transactions are disallowed. Stocks that are highly traded and therefore easy for the broker to locate are called "easy-to-borrow", and traders can short them with no limits. "hard-to-borrow" stocks are generally stocks that are not as easily located and therefore traders are forbidden from selling short for those particular stocks. There is yet a third class of short sale tests known as Threshold Securities. Threshold stocks may be sold short on a limited basis to a known quantity limit that is seeded in the risk management system at the start of the day by the broker. For this case, each account has a fixed number of these securities that they can sell short up to that quantity before further shorting is disabled. The classification of these stocks and the strict rules governing their use was imposed by the SEC through Regulation SHO in 2005. Regulation 15C3-5 now requires sponsoring brokers to provide systems that enforce this regulation, stopping all orders that are not allowed from reaching the exchange.

See http://en.wikipedia.org/wiki/Naked_short_selling#Regulation_SHO

Regulation SHO tests are a hybrid of Real-Time and Best Effort tests. Easy and Hard to borrow lists can be distributed to the sites and the risk systems can check whether shorting is allowed by keeping a list of all stocks and whether shorting is enabled. Threshold stocks are Best Effort by nature because one number, the number of stocks one may borrow, is shared by multiple distributed systems. Applying heuristics to solve this problem is preferred.

e) Clearly Erroneous Tests. Best-Effort and Real-Time

Rule 15C3-5 says an order to buy or sell a stock is considered "erroneous" if the price to buy or sell the stock is more than plus or minus 10% away from the last sale (or the last tick) for that stock. If MSFT just sold for $24.00 then the maximum one can buy/sell the stock for is $24.24 and $23.76 respectively. All other orders must be stopped before they reach the exchange.

As each order passes through a 15C3-5 compliant system, it must be checked to verify whether it is Clearly Erroneous or not. If it fails the test, the order must never be sent to the market. This is a Real-Time test. However, the steam of "last sale" prices is sent to the risk management system endpoints using a price feed (such as CTS). The rate at which one can update systems with the last price is limited by the latency of the price feed; the test is best-effort in this respect. Consider the case where at the instant an order is sent a quote is in flight that would render it compliant but the risk system fails to receive the information before the order is rejected. This is not of significant concern as current market stability and limited price variation make this a very unlikely corner case. However, a well designed risk system must seek to update its internal price lists in a timely a manner as is possible/practical.

f) "Fat Finger" Tests and Per Account Limit Tests. Real-Time

Rule 15C3-5 stipulates that broker compliance systems must stop so-called "fat finger" orders. This is the case where an order to buy or sell stock has a quantity, price, or value (price times quantity) that is not logical (e.g., "buy one billion shares of MSFT"). One specific "flash crash" was precipitated by an order with an illogically high quantity. This solution will be addressed by providing a maximum price, quantity, and value (Price times Quantity) for each client account. Risk management personnel can set such limits based on their historic knowledge of each account and discussions with traders. Note that the average order on the market is low quantity (100 to 200 shares) strongly suggesting that client accounts can be "clamped" with known and relatively low per-order quantity limits. These values will be set as an account property (configuration item) of a compliant system. Any order that exceeds these limits will not be allowed to reach the market.

This test is Real-Time in nature as it can be distributed to all endpoints (exchanges) and enforced in Real-Time by each system.

g) Repeat Order—Order Frequency—Runaway Algorithm Test. Real-Time

SEC 15C3-5 stipulates that complaint systems should test for repeat orders as they are a common indication of a faulty algorithm. This can be achieved by keeping a running count of orders of a particular stock per client per connection per unit time to an exchange where repeated orders exceeding a given maximum per unit time (both frequency and we believe a maximum total quantity). These limits will be created by risk management personnel after discussion with traders and set as account configuration properties. The proposal is to utilize a "dual burst", token bucketsystem that allows a limited maximum burst as well as a sustained maximum frequency limit.

The total metric describes the idea of tracking the total number of open orders, the dollar value of those orders (assuming they fill), and measuring against a known constant based on account knowledge.

h) Direct and Exclusive Control. Best Effort or Real-Time

The 15C3-5 rule also stipulates that any risk management system must be under the "Direct and Exclusive Control" of the sponsoring broker. While this does not impose a specific functional behavior, it does impose security restrictions that make it imperative that any system provides an approach that can not be bypassed or tampered with by any party other then the sponsoring broker. This requirement makes a number of approaches proposed where brokerage modules are inserted into client systems seem questionable and yields a dilemma for system designers to seek a solution that is in a separate system while imposing the absolute minimum latency. Other software-only solutions are not plausible.

i) Exposure Tests. Best Effort

While not specifically stipulated by 15C3-5, the system can institute support for Exposure tests. We define an exposure test as a limit on 1) The total number of discrete orders a single account may have outstanding at any given moment. Our experience suggests that traders typically have a bound number of simultaneous open orders on a given exchange and that if the number is poorly formed either warn the Risk Manager (through a console) in Real-Time or at a higher value disable further orders—

2) and Exposure value, which we define as the total dollar value of all open orders on all exchanges which we believe should not exceed limits which can be expressed as either a percentage or multiple of total credit limits or a constant.

j) Broker Account or Session Disable—Console Based Control

In addition to 15C3-5 requirements, the system provides basic per account controls to the sponsoring broker. If a broker decides to disable (or re-enable) trading at anytime during the day, a settable control is provided at the risk console. This can be done on a per account (client global) or per-session basis.

k) Reporting Requirements

Regulation 15C3-5 also imposes reporting requirements for the sponsoring broker. A collection of reports will be supported including statistical overview of system events, alarms, and interventions. Moreover, a detailed log and report of each action the system takes pursuant to regulation 15C3-5. Finally, a certification report will be provided to show that the system has performed as required. These functions are provided by the Risk Console and Risk Manager.

2. Major Components Overview

This next section provides an overview of the how the Risk Management System implements the rules above. The Risk Management System includes the following major components:

POP Sniffer
Sniffer Module (SM) and POP Sniffer Server
Sniffer Module FPGA/PIE (Packet Inspection Engine)
Risk Server (Central Server)
Risk Management (Monitoring) Console
Remote Management Console and Command Line Interface Selected components and their interconnection are shown in the Risk Management System overview diagram of FIG. 1. The Risk Management System 100 includes one or more POP Sniffers 101-1, 101-2, . . . 101-$n$ disposed between corresponding client devices such as a Client Algorithm Server 104-1, 104-2, . . . 104-$m$ and a corresponding Exchanger Server 110 at a liquidity destination (market order processing) such as Order Matching Engines (shown are one each for the NASDAQ 110-1, NYSE 110-2, and BATS 110-3 markets). Also included as part of the Risk Management System 100 are a Remote Monitoring Console and Server for Live Monitoring 112, a Risk Server 114, and Risk Management Console 116.

Figure 2:
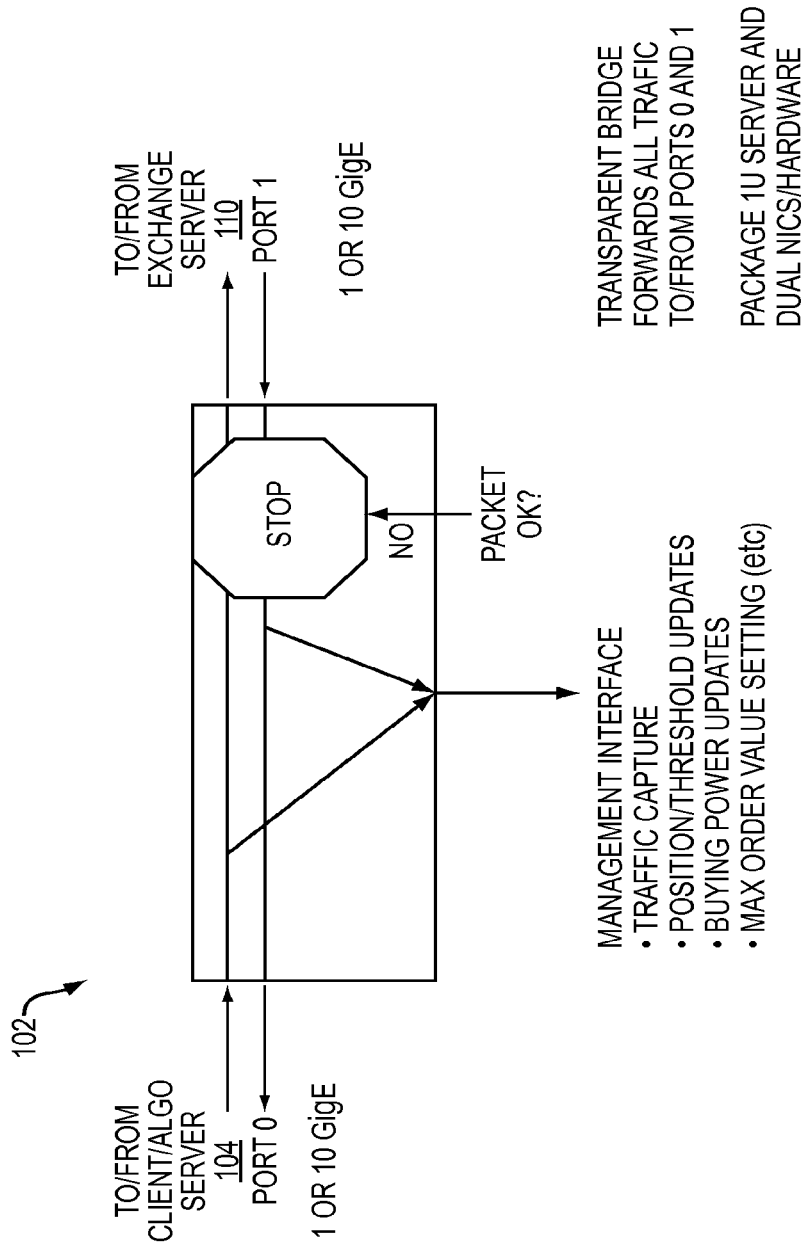
FIG. 2 is a logic flow diagram for the POP Sniffer.

The POP Sniffers 102 operate as in-line, transparent, cut through devices for inspecting secure transaction data and ensuring compliance before it is sent to a liquidity destination. FIG. 2 is a high level conceptual diagram of an example POP Sniffer 102 as a bi-directional, two-port device with packet inspection logic. Data packets representing market orders are received from a Client/Algorithm Server 104 and forwarded to a liquidity destination (e.g., one of the Exchanges Servers 110). Packets are inspected for compliance with minimum latency (less than 1 microsecond) and either passed or stopped. Management interfaces allow specifying traffic capture, position threshold updates, buying power updates, maximum order value settings and other rules to determine packet disposition. In a preferred implementation, packets are be "stopped" by either marking the order in a way that makes in economically harmless or causes intentional failure at the exchange server, or by disabling the affected connection, as described in more detail below.

Figure 3:
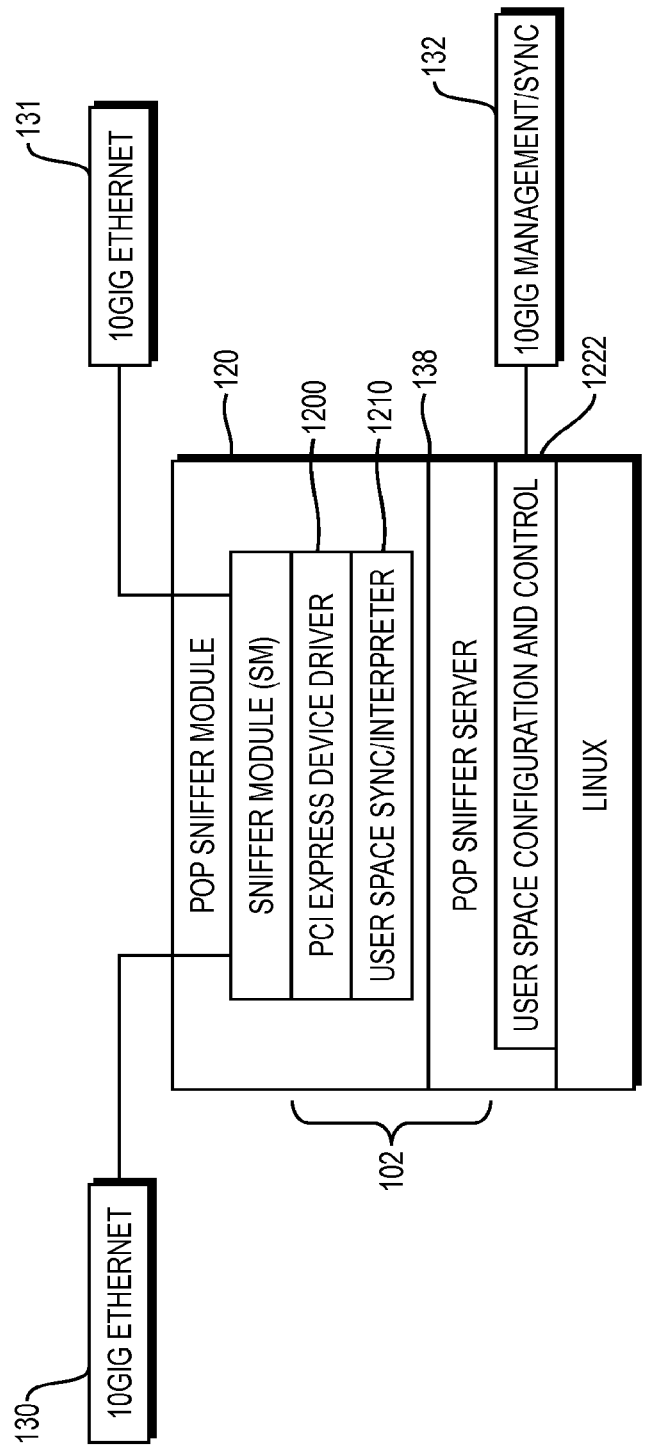
FIG. 3 illustrates the POP Sniffer and Pop Sniffer Server.

FIG. 3 is a more detailed functional diagram of the POP Sniffer 102, including Sniffer Module 120 and POP Sniffer Server 122. The Sniffer Module (SM) 120 is hardware module that plugs into a POP Sniffer Server 122 via a server interface, such as PCI-Express bus, and contains selected portions of the packet processing logic implemented in a Field Programmable Gate Array (FPGA). In the preferred design, it communicates with the Client Algorithm Servers 104 and Market Engines (Exchange Servers 110) via a pair of 10 GigaBit Ethernet (GigE) interfaces 130, 131. The POP Sniffer Server 122 communicates with the Sniffer Module 120 as well as external management devices via another interface such as a third 10 GigE 132 serving as a Management Port between the POP Sniffer Server 122 and external data processing systems. The system can also be implemented on other Layer 1-2 interfaces such as Infiniband.

The Sniffer Module 120 sends market events and streams of interest to a device driver 1200 which provides a simple conduit to user space. It is also responsible for booting the Sniffer Module 120 and programming its registers on an ongoing basis. For example, when a symbol is disabled, this is the module responsible for all such interaction. The User Space Sync/Interpreter 1210 is responsible for receiving all Sniffer Module 120 data streams, verifying their integrity, and maintaining global values such as buying power (credit limits). The User Space Configuration and Control module 1222 in POP Sniffer Server 122 functionality includes maintaining ongoing status for live monitoring of the system, receiving global updates from distributed systems, and interacting with the global configuration and control framework.

Sniffer Module (SM) 120

The POP Sniffer Module 120 includes suitable high speed communication interfaces and a Field Programmable Gate Array (FGPA) such as a modern Altera or Xilinx FPGA that supports 10 Gigabit Base-R and PCI Express.

The Sniffer FPGA (Packet Inspection Engine) (Part of 120)

Figure 4:
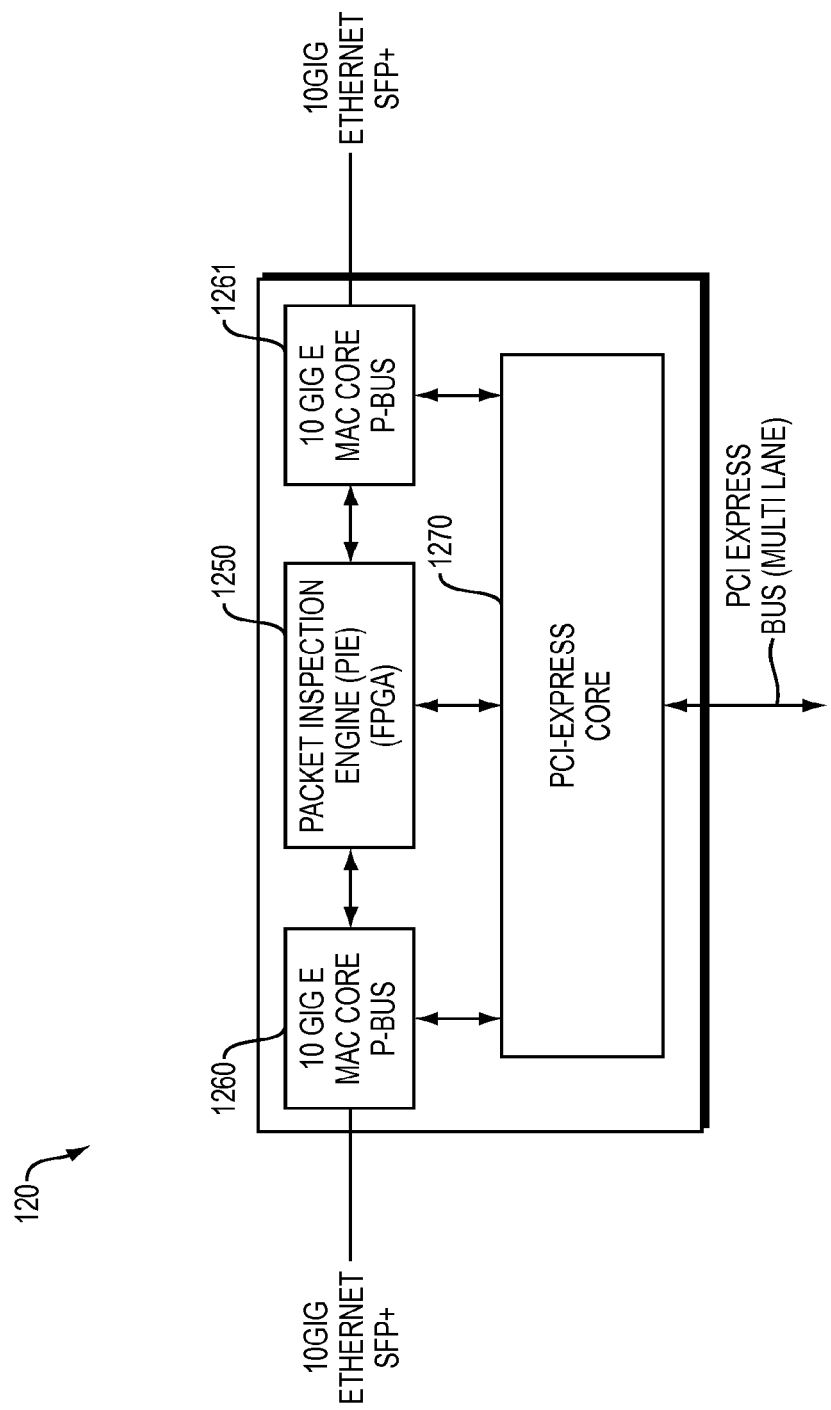
FIG. 4 is an overview of the POP Sniffer FPGA.

The Sniffer Module 120 as implemented in the platform is shown in FIG. 4. The Packet Inspection Engine (PIE) 1250, implemented on the FPGA, is where the majority of the special hardware based packet processing functionality resides. Two of the three required core designs (including the two 10 GigE MAC/PCS Cores 1260, 1261 and PCI Express Core 1210) are typically provided in the preferred off the shelf module components. Customer functions required to support traffic management and data functions herein are provided by the Packet Inspection Engine (PIE) logic.

The Risk Server (Central Server) 114

The Risk Server 114, as was briefly shown and mentioned in connection with FIG. 1 above, is a horizontally scalable data processing system that serves as the Risk Management System's central controller. It serves many functions including:

Providing an API for customers to integrate the Risk Management System 100 with larger middle-ware/risk/infrastructure systems. Clients who request a custom integration will require a flexible API that provides such services without imposing major redesign work on the core system.

Provides cross account synchronization on major items such as positions and buying power. As the Risk Management System 100 runs, updates to these are constantly being circulated to POP Sniffers 102 and back to Central Server 114.

Provides a dynamic database of all current risk metrics and calculations making them accessible to risk consoles and custom systems alike.

Provides-maintains a client account database that includes critical start of day information such as credit limits, threshold lists, and disabled securities. The system will need to be seeded at the start of each trading day with this critical information. Moreover, with the optional addition of a database it can be easily extended to provide a full trading platform providing OATS and clearing upload support.

Provides a roles-based "access control" system providing secure access to various user types allowing some to adjust account information while others can be limited to monitor only status.

Provides reports that tally account risk profiles while also providing global reports to support the requirements specified in rule 15C3-5.

Provides secure publish/subscribe information journal allowing external systems to receive drop copy data without having to utilize exchange drop copy ports.

The Risk Management Console 116

The Risk Management Console 116 (FIG. 1) provides various views of client accounts including key settings (settable limits etc.), active alarm display and logging for reporting, as well as key controls, such as 'disable account'. This unit is expected to be a fairy thin client design paving the way for a more robust web services based paradigm. It also sets up a true multi-instrument utility for the long term.

The Remote (Monitoring) Management Console and CLI 112

The Remote (Monitoring) Management Console 112 (FIG. 1) has limited data access to provide a remote monitoring function to support critical system monitoring, failover control for high availability, and remote access for live and overnight hardware and software patches. This can be based on the Risk Management Console 116 software base with sufficient access control to allow the provider/operator of the Risk Management 116 platform to aid during system faults.

3. Functional Description of the Risk Management System

This section provides a description of the Risk Management System 100 from a functional and topological standpoint.

The Risk Management System 100 solves 15C3-5 requirements by providing an intelligent "sniffer" device 102 located at the either client's (trader's) Point of Presence (POP) (e.g., 104) or the sponsoring broker's facility.

Figure 5:
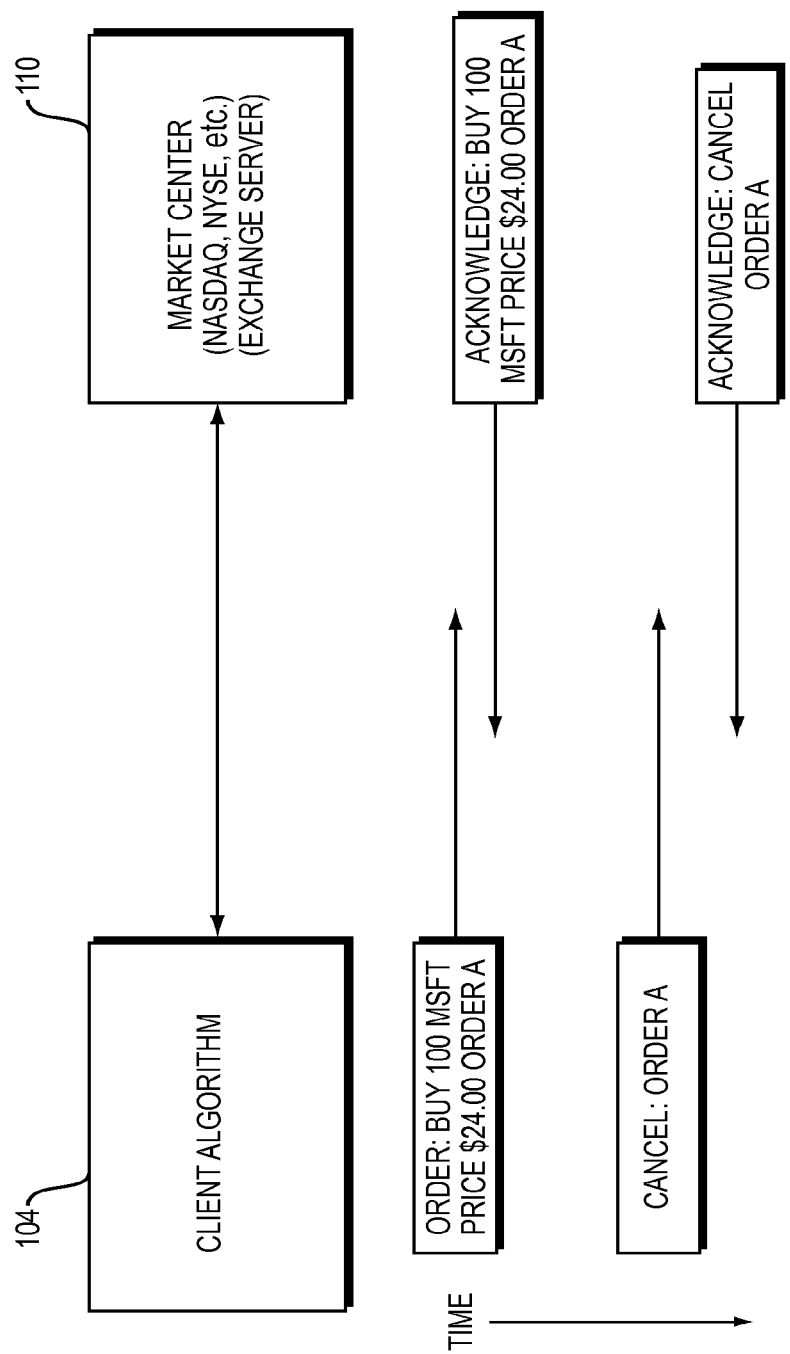
FIG. 5 is a simple example flow for a client to market server interaction.

FIG. 5 shows a typical Client Algorithm server 104 interacting with an Exchange Server 110 (also referred to as the "Market Center" herein). The figure provides a pictorial of a common interaction, an order for "100 Shares of Microsoft at $24.00" that is not filled, followed by a cancel. Note that the Market Center 110 acknowledges all transactions in the reverse direction. The diagram abstracts out any network elements. Note that the packet flow is transported using standard network protocols such as either TCP/IP or UDP depending on the Market Center 110. This relationship may be supported by multiple market sessions each comprised of a discrete TCP/IP or UDP/IP flow.

Figure 6:
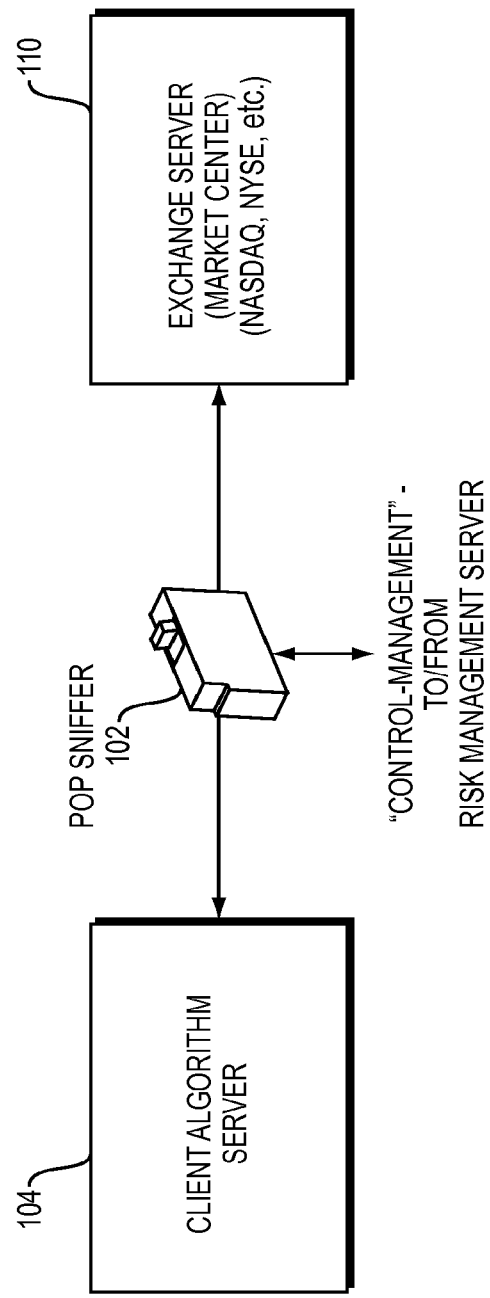
FIG. 6 is a model of the Risk Management System as a circuit breaker.

Referring to FIG. 6, the POP Sniffer 102 can be thought of as sitting "on the wire" between a Client Server 104 and Exchange Server 110 (Market Center). Utilizing a circuit breaker analogy is a useful way to model the technology for a number of reasons. First, while it silently copies data flows to its host 122, it also acts identically to a "piece of wire" or a "segment of fiber" when there is no action required by the Risk Management System 100 and it does not change the packets or interfere with the flow of information in any way. This is due to the fact that the POP Sniffer 102 is a transparent device. Transparent devices can be characterized by the fact that they do not impose any Layer 2 or Layer 3 interaction, they simply repeat input data to the output. They do not respond to ICMP Pings and they do not decrement time to live on IP headers. From a Layer 2 (Ethernet) perspective, such a device operates in "promiscuous" mode, never responding to ARP or RARP requests. Also, TCP connections are never terminated on this device, it is a semi passive-eavesdropping system. This is one of a number of a number of differentiating characteristic of the design.

When a circuit breaker trips, it breaks a circuit. The POP Sniffer 102 does the same under certain circumstances as one of its two failure modes. For example, when trading is disabled by the broker, the Risk Management System 100 breaks the flow and the market is disconnected from the Client Algorithmic Server. The Market Center (Exchange Server) will cancel all open orders on such disconnects.

Figure 7A:
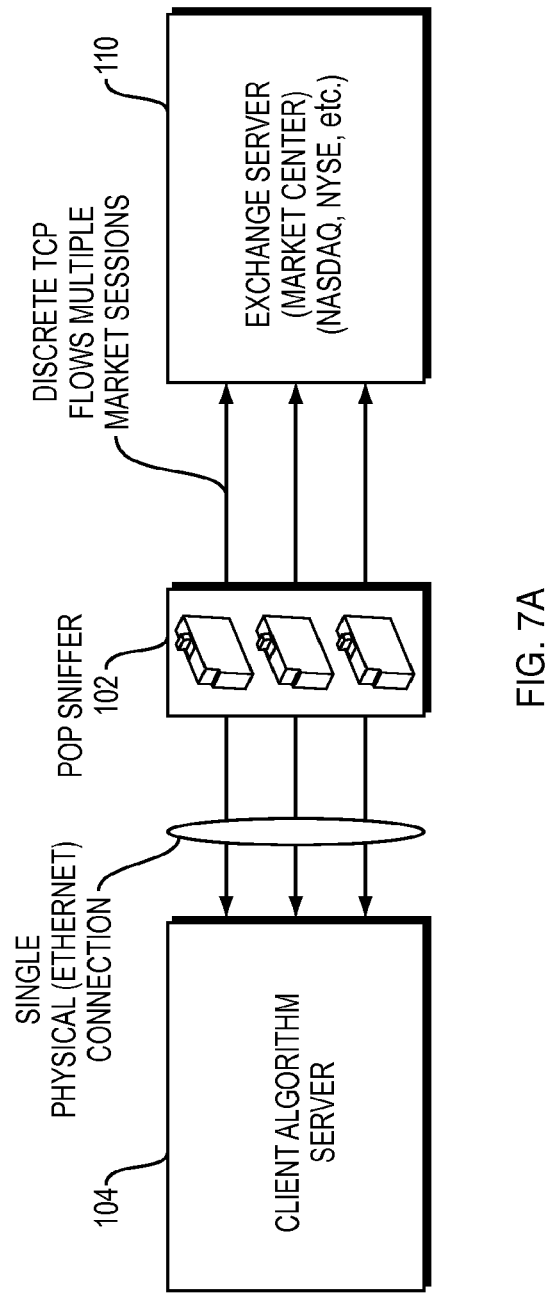
FIGS. 7A, 7B and 7C illustrate different POP Sniffer Deployments.

However, this is only true for an offending connection. If the relationship between the devices consists of more than one TCP/IP client session, only the offending flow is disabled. FIG. 7A illustrates this point. Packets flow through the POP Sniffer(s) 102 and are inspected at wire speed while imposing very little latency. The circuit breaker analogy is also useful because it indicates critical behavioral characteristics for such a design. This design exploits the fact that exceptions where intervention is required by the device are extremely rare to the point where one can consider them statistically insignificant.

A second failure mode provided by the Risk Management System 100 is a packet "touch-up" functionality where poorly formed orders are marked in a way that make them economically harmless or to cause them to be failed by exchange systems.

Figure 7B:
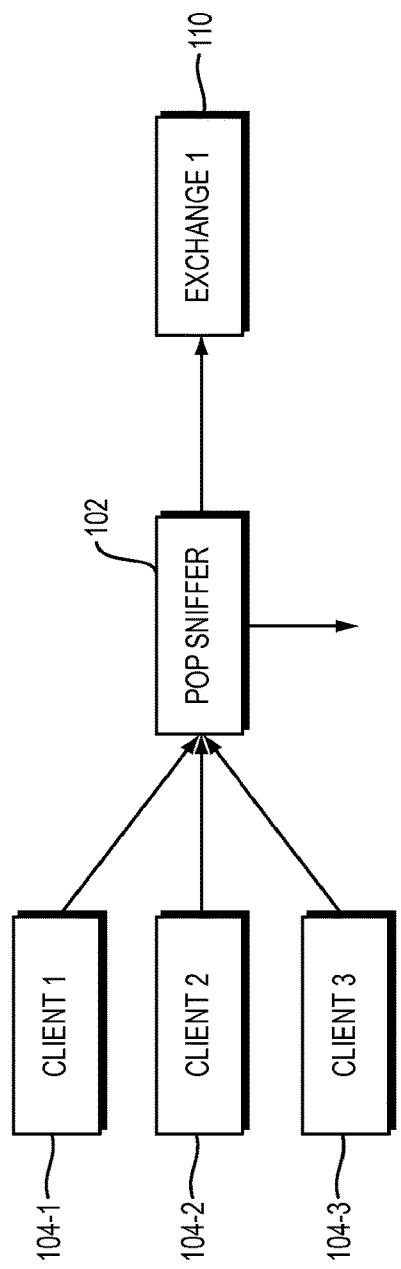
Figure 7C:
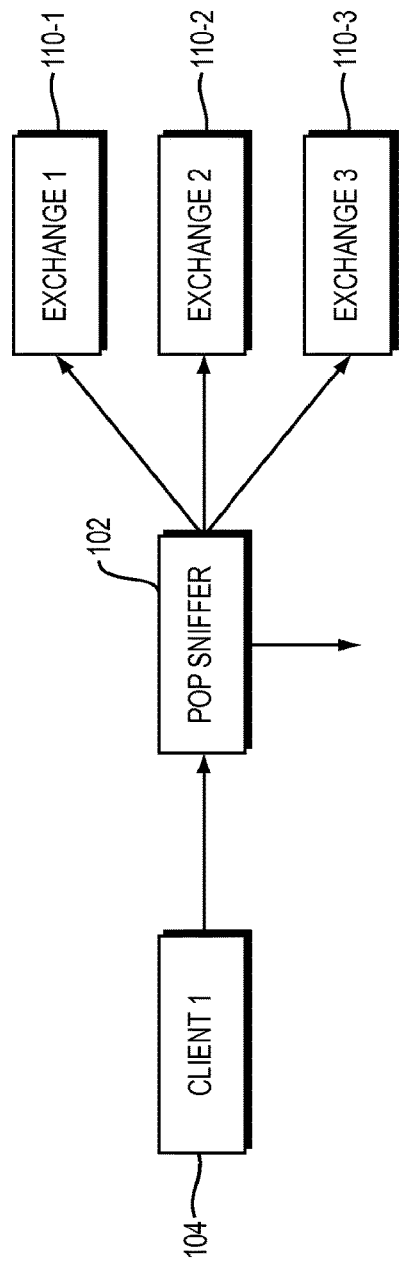

It should be understood that different logical topologies of POP Sniffer deployments are possible. As shown in FIG. 7B, multiple clients 104-1, 104-2, 104-3 may share a single POP sniffer unit 102. In other scenarios, as shown in FIG. 7C a single client 104 may have access to multiple Exchange Servers 110-1, 110-2, 110-3.

The POP Sniffer 102 also differentiates itself utilizing a cut-through approach to packet processing rather than the more common "Store and Forward" method. Other topologies utilize Store-and-Forward technology, where devices read an entire packet in to a packet processing device's memory, often make forwarding decisions and perform analysis thereafter, and only thereafter forwarding the data. This has a negative impact on performance as the time required to read the packet is additive to latency. Cut-through devices such as the POP Sniffer 102 avoid this latency as they are fast enough to begin sending a datagram before is has been completely received. If a packet is found to be erroneous while such inspection occurs, the offending packet can be discarded by intentionally causing Layer 2 error checking fields to be set to erroneous values. A two-port "only" POP Sniffer topology with this behavior is another differentiating characteristic.

Figure 8:
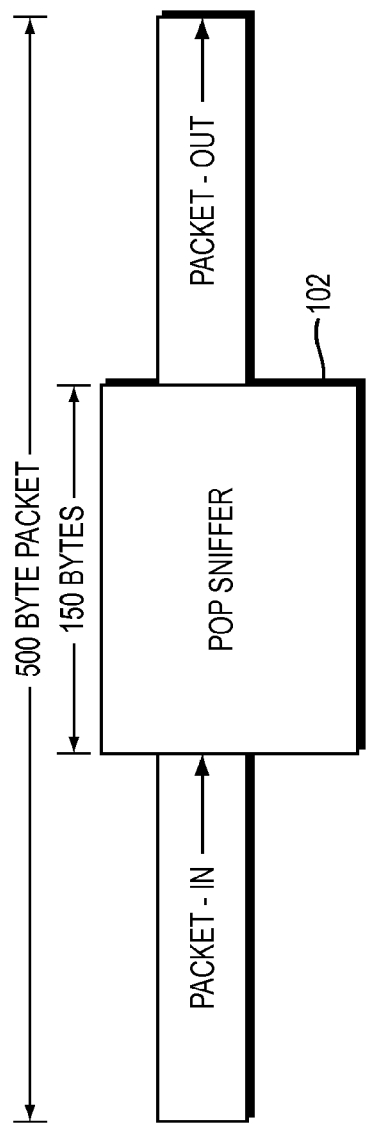
FIG. 8 shows cut-through processing of a packet "in flight" midway through the POP Sniffer.

FIG. 8 provides an illustration of such a packet in flight through a cut-through device such as the POP Sniffer 102. When halfway through, a hypothetical 500 byte long packet has 175 bytes still being transmitted and another 175 already sent. Finally, 150 bytes are in the POP Sniffer 102 pipeline and are already in the process being inspected, before the entire 500 byte packet is received.

Management Port Functionality

Previously we discussed a "circuit breaker analogy" to describing the system's behavior as it relates to the POP Sniffer's 102 Client 104 and Market 110 facing interfaces. This section describes the behavior of the third "side band" Management Port on the POP Sniffer Server 122 that communicates with the Risk Server 114 and other POP Sniffer(s) 102 and frames the POP Sniffer 102 in a larger topological view.

Figure 9:
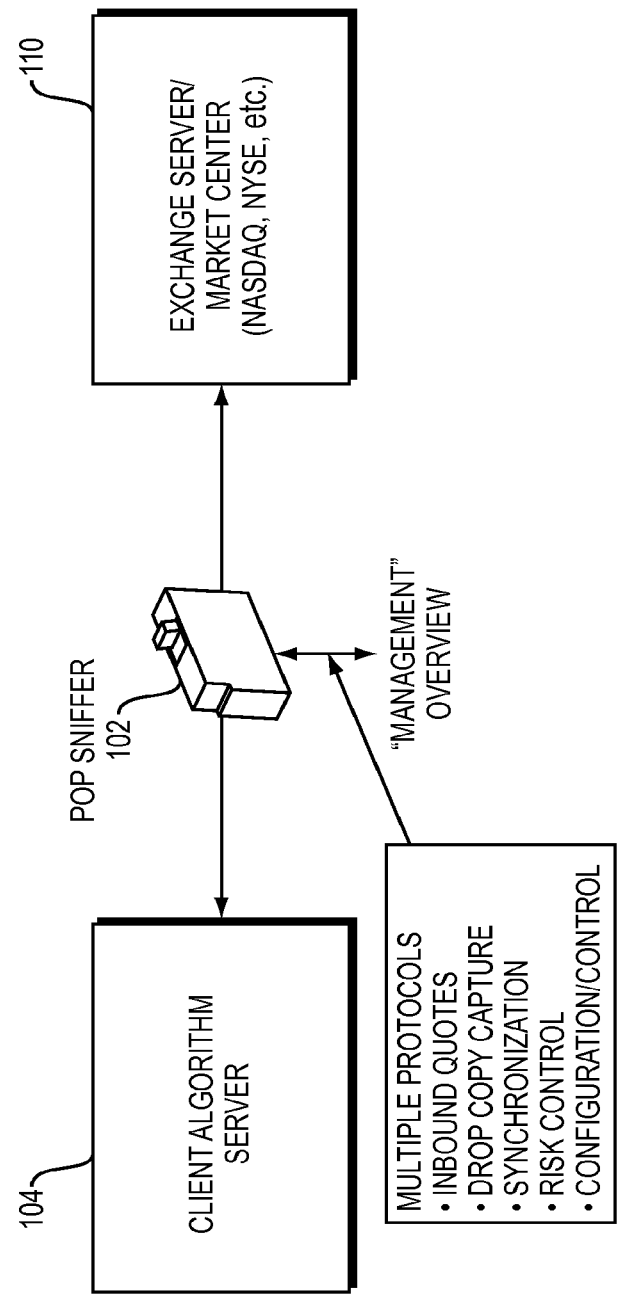
FIG. 9 shows the Control and Management Port.

Referring back to FIG. 3, and FIG. 9, Management Port 138 on the POP Sniffer Module 120 (output to the POP Sniffer Server 122) does not (presently) forward data to the Client-Market facing ports. It works silently in the background functioning as a silent controller, capturing data for the Central Risk Server 114. For example, it can retrieve tick data to update price tables on the hardware portion of the Sniffer Module 120, and sends/receives critical events to/from the rest of Risk Management System 100.

There are five distinct protocols/functions that the Management Port utilizes: i) a Tick Delivery Protocol (TDP), ii) a Drop Copy Service Protocol (DSP), iii) Inter Server Synchronization Protocol (ISS), iv) a Risk Control Protocol (RCP), and v) Control and Configuration Protocol (CP). The Protocols are defined as follows:

TDP—Tick Distribution Protocol. This is a client protocol that connects to the main Risk Server 114 (or possibly a local exchange tick service) and receives a stream of normalized "last sale" 114 ticks. This stream of price information is forwarded to the FPGA's price tables on a continuous basis to provide the latest price information for required "clearly erroneous" tests. The software (slow path) can also access this information as required. The main server receives national (CTS) last tick data and distributes it to the POP Sniffers 102 using a normalized multi-cast feed with error channels for recovering missing packets.

DSP—Drop Copy Service Protocol. This service offered by the POP Sniffer 102 provides a simple "drop copy" feed for interested subscribers. Normally, Drop Copy ports are received from liquidity destinations. Drop Copy Ports generally provide all of the required events received through the Risk Management Systems' 100 sniffing functionality which can in turn be utilized by both the Risk Management Server and any legacy risk systems an enterprise customer may wish to migrate. The Risk Management Server 114 maintains an active database of all open orders, buying power consumption, and so on, to provide the central risk functionality.

ISP—Inter Server Synchronization (ISP) protocol. Certain items that are distributed across the systems (such as distributed buying power/credit limits, positions, and so on) need to be synchronized across multiple systems. All POP Sniffers 102 require the latest "distributed" view of these numbers. ISP will provide this functionality by providing a tokenized "ring" or "hub" protocol that takes key position, buying power, and other such items, and synchronizes the systems on a best-effort basis. As suggested earlier, this may be completely contained in the RCP protocol (defined below).

RCP—Risk Control Protocol—The Risk Control Protocol (RCP) is a low bandwidth, client based, protocol where the service is provided by the Risk Management Server 114. RCP is responsible for all Risk Management application controls such as i) Account disable when global risk console detects an account disable fault (such as buying power exhaustion or manual disable), ii) event transmission when faults are detected they must be forwarded to the main Risk Server, iii) intra-day controls such as disable symbol, add symbol, and so on. Any Risk Application level events are embedded in this protocol. As outlined above, all of the functionality described in ISP above can be added to this protocol.

CP—Control and Configuration Protocol. All system configuration will be maintained through a central distributed "registry" or configuration database in the Risk Server 114. All POP Sniffers 102 load all configuration information on boot from this central service. Moreover, monitoring and control from a system administration point of view will also be achieved through this protocol. Start of day and intra-day configuration (buying power, per client symbol tables, and software/hardware configuration) will be maintained in this single entity. Access controls are required to ensure access only by privileged personnel.

Detailed Discussion of POP Sniffer 102 Implementation

The above set of protocols illustrates the size and difficulty the 15C3-5 problem presents and why the topology described herein is more appropriate when compared to other inbox or risk-service on a PCI-Express card solutions. The nature of this problem lends itself to utilizing a server implementing some of the stated functions in software, combined with carefully positioned hardware to fulfill these requirements. We believe the balance between these functions is a critical and novel aspect of the design.

The POP Sniffer 102 internal architecture described below explains this in more detail. Other systems attempt to solve the entire problem in hardware or software alone, which is undesirable.

Figure 10A:
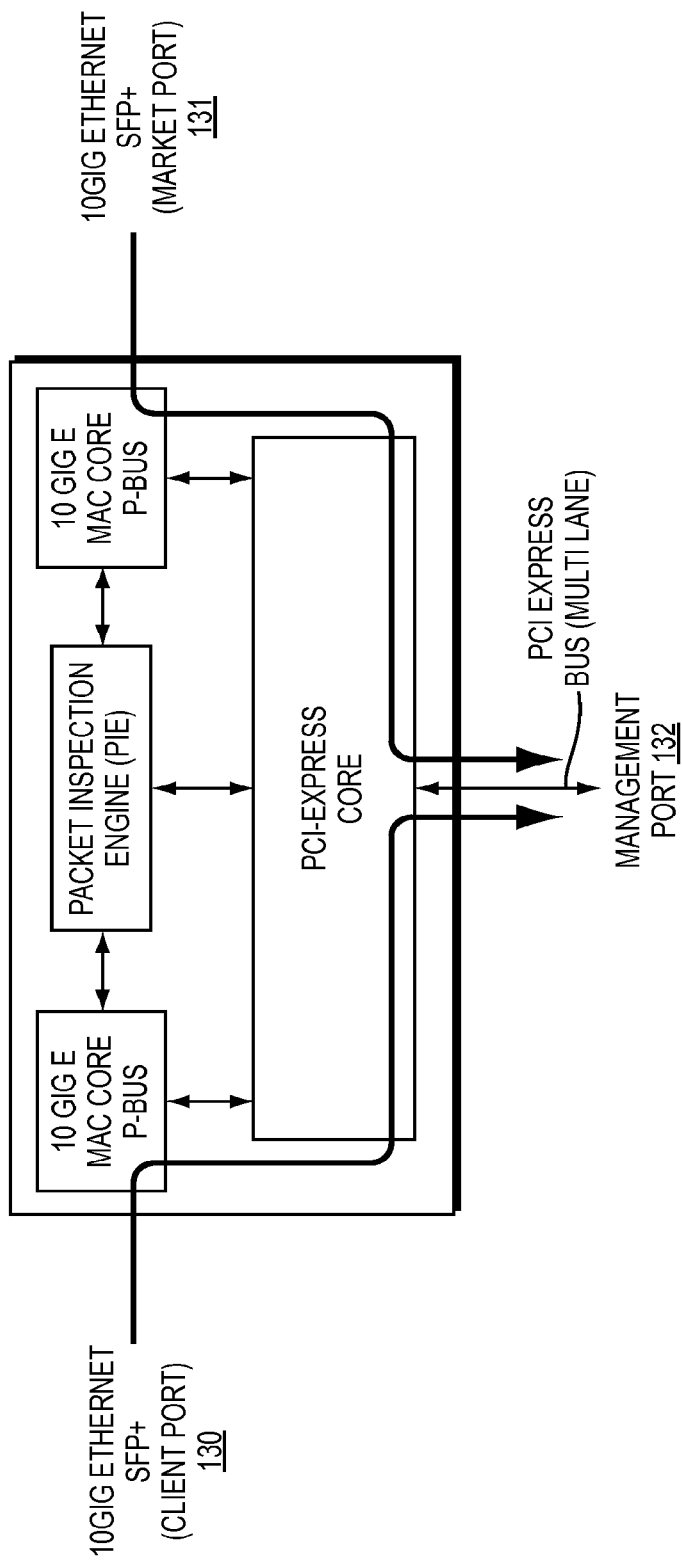
FIGS. 10A and 10B show slow path and fast path handling.
Figure 10B:
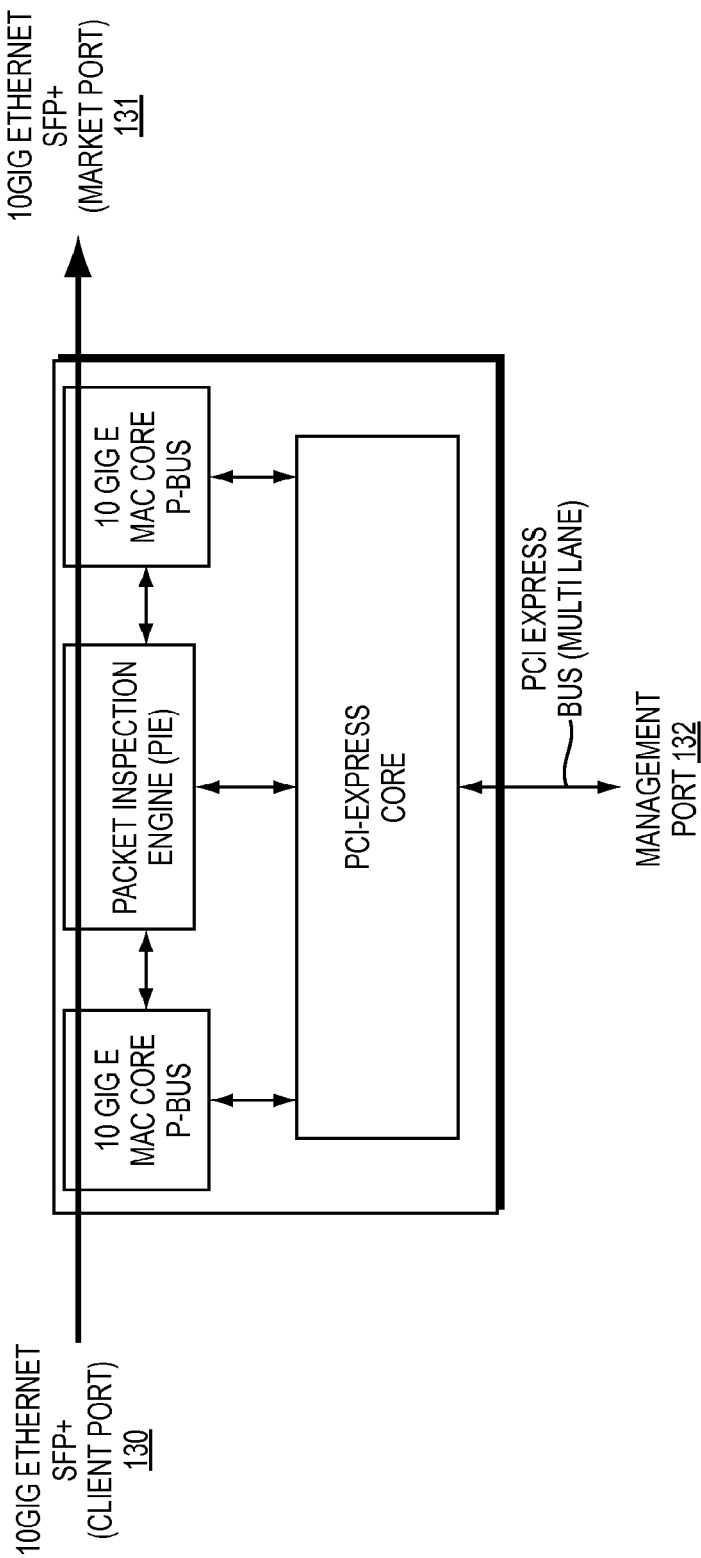

FIGS. 10A and 10B provides an overview of the POP Sniffer 102 architecture. It is useful to model it in two layers as shown. FIG. 10A illustrates the "pure" sniffing/capture function data path and FIG. 10B shows a "fast-path" Real-Time packet inspection data-path. The two functions have limited relationships and are virtually independent.

The data capture function of FIG. 10A (from the Client 130 and Market Ports 131 to the Management Port 132) allows the system to capture packets in the software domain. All data received on both ports is forwarded to the POP Server host device driver allowing a dedicated core (e.g., the POP Server CPU (not shown but implied in the drawings)) to inspect the traffic and reconstruct the events received from the client and the market. Because the adjacent systems guarantee packet delivery, it is guaranteed that the driver will receive all events as well. Dropped or mis-ordered packets are reordered and a reliable stream of trading events is created. This allows us to off-load the non-time sensitive functions to the host server and create an alternative drop copy port.

A Real-Time packet inspection function as shown in FIG. 10B provides Real-Time packet forwarding for ultra low latency performance, performing the minimum functions required for Real-Time packet inspection. This is called the fast or hardware path. Supported functions include i) Inspect the packet for proper Quantity, ii) Price, iii) Value (Price× Quantity) iv) per symbol erroneous price detection, and v) per account per symbol modality (enable buy, enable sell, enable sell short). Note that all such inspection need only be performed in the client to market direction. All other functionality is served in the software path of FIG. 10A (the slow path).

The combination of offloading non-essential functions to the software (slow) path and providing a fully functional server provides a powerful solution to the difficult 15C3-5 problem.

FIG. 11 is a table that outlines the preferred division of functionality between hardware and software in the POP Sniffer 102. Note that functions that were identified as Real-Time in nature in the Functional Requirements section are serviced by Fast Path hardware (the FIG. 10B flow) while all others (Best Effort test) are offloaded to the POP Sniffer Server host for Slow Path Processing (the FIG. 10A flow).

Figure 12:
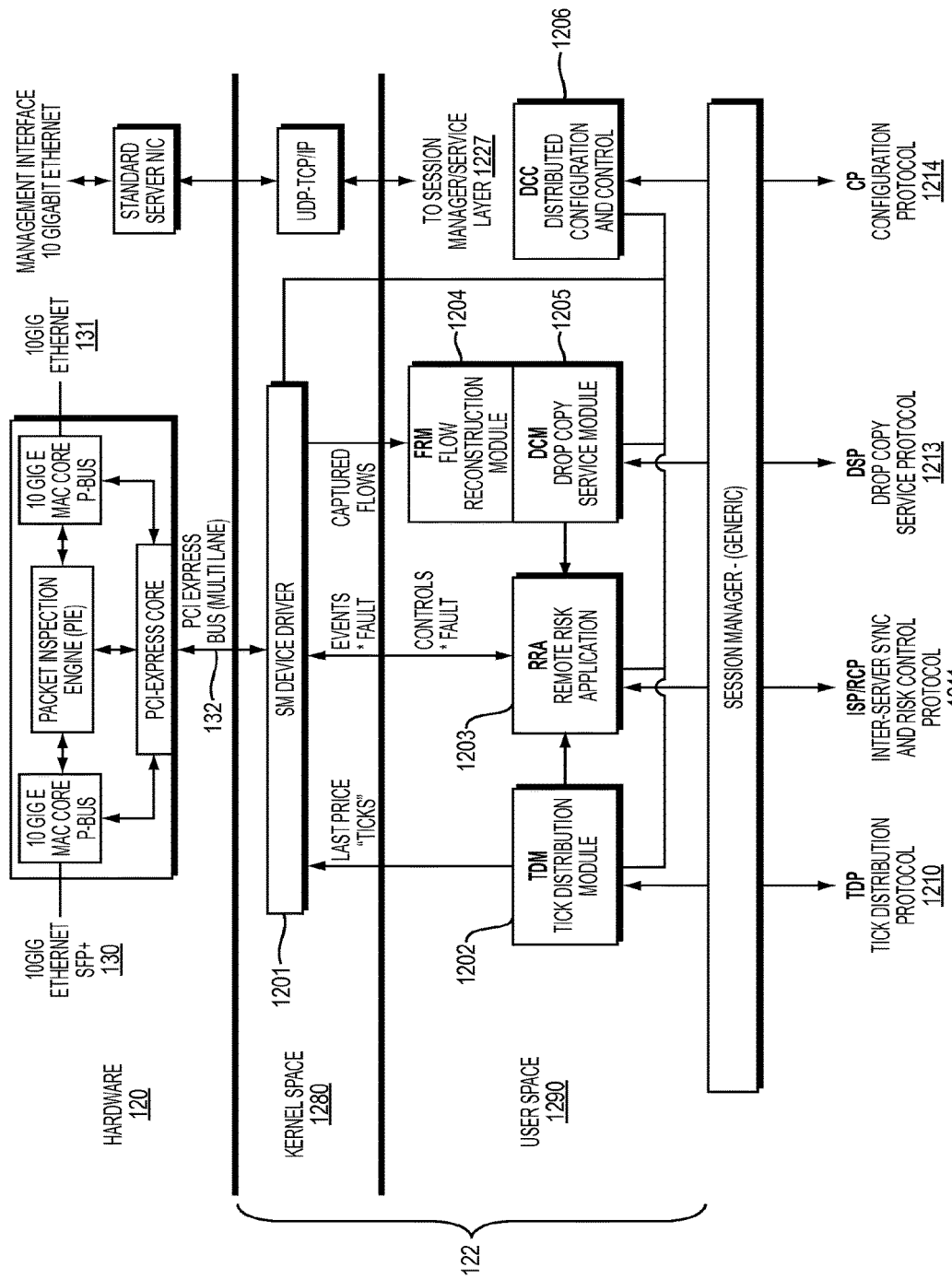
FIG. 12 is a detached software architecture diagram of the POP Sniffer Server.

FIG. 12 provides a modular decomposition of the POP Sniffer 102 architecture in data-flow form. As can be seen, functionality is divided between the Hardware (FPGA) in the Sniffer Models 120 as already described above, and Kernel Space and User Space on the POP Server 122. The functionality of each illustrated component is described as follows:

SM Device Driver 1201—The Sniffer Module (SM) device driver 1201 runs in kernel space 1280 and presents an API for the components listed above. The device driver is responsible for "Phase 0" power up configuration of the POP Sniffer Module hardware 120. Upon initialization-power up, the driver fetches the latest FPGA configuration from a configuration database provided by the DCC module 1206. Once the board is verified and ready, the driver's API in initialized, allowing all other modules to initiate communication with the module. The driver thereafter serves as a conduit, providing a data path between user space applications (as shown above) and the hardware.

Tick Distribution Module 1202—The Tick Distribution Module 1202 in User Space 1290 connects and subscribes to a "last sale" tick protocol as provided by the Risk Management Server. It receives last sale price updates and forwards them to the hardware (SM). The SM maintains a database of current prices, checking each market-bound order for erroneous pricing. TDM also maintains a database, which presents an internal API for software path services and non-volatile snapshots for power up recovery. All Tick Distribution Protocol 1210 (TDP) messages are received and processed by this module.

Flow Reconstruction Module (FRM) 1204—The Flow Reconstruction Module 1204 presents a subscription-based API for upper layer services to inspect client-market events. As packets are received on the hardware Sniffer Module Ethernet interfaces (130, 131, 132), they are all forwarded through the device driver to this module. The streams are in raw form, including out of order TCP packets, TCP ACKS, and other traffic on the wire that is not of interest, such as ARP, RARP, and unrelated traffic (for example, a trader may be receiving quotes on the same interface). The FRM 1204 recognizes the flows of interest, reconstructs them, dropping all other packets. This includes inspecting TCP headers and reassembling the initial flow if packets are out of order or malformed. Hence, the module's input is raw line data, and its output is normalized event flows from both the client and market. The data is preferably preserved in a journal, allowing subscribers to rewind if resynchronization is required.

Drop Copy Service Module (DCM) 1205—The Drop Copy Service Module presents a generic Drop Copy Service (in the form of the DSP protocol 1213) for the central risk 1205 server 114 and any other interested applications. The DCM subscribes to the FRM 1204, maintaining a normalized, ordered, drop copy stream. The central Risk Manager 114 subscribes to this flow, allowing it to monitor client account activity. Events are captured for both the client-market direction and market-client direction. The service must provide a journaling (rewindable) service to allow risk management systems to resynchronize when recovering from outages. The Drop Copy service is also made available internal applications, most notably the Risk Application, allowing the product to make autonomous decisions with Real-Time information. For example, monitoring the frequency of repeated orders for the runaway algorithm can be achieved using this stream.

Remote Risk Application (RRA) 1203—The Remote Risk Application 1203 is the central entity that performs all local risk analysis (software path), generates or reports all policing initiated by the hardware SM 120, and provides a remote proxy agent for the Risk Server 114 to record or initiate actions. Hence, there are three classes of action supported by this module based on the initiating entity; SM 120 (hardware) initiated events, RRA 1203 initiated events, central Risk Manager 114 initiated events, all defined as follows:

SM initiated events. This class of event is defined as any policing event (stopping a flow or setting quantity to zero) that is detected and initiated by the hardware SM 120. An example of such an event is a disabled symbol, where the hardware looks up in-flight order symbols in hardware and permits or denies transmission to the exchange. When these events are detected, notification is propagated to the RRA 1203 which notifies the Risk Server 114 application via the RCP protocol 1211.

RRA 1203 initiated events. This class of events is defined as any policing event that is detected and initiated in the RRA software module 1203. An example of this class of event includes runaway algorithm test. The runaway algorithm test requires the RRA module to detect repeated orders as received from the slow path. The RRA 1203 will track each order flow in software and detect excessive amounts of repeated orders. When the threshold is met the RRA 1203 will police and notify. The policing (or enforcement action) consists of sending a message to the SM 120 to disable the symbol. Notification consists of sending a message to the risk management console via the RCP protocol 1211. This allows the risk management application to flash an alarm and notify risk management personnel.

Risk Server 114 (application) initiated events. This class of event is defined as any event that is detected and initiated in the central Risk Manager. An example of this class of test includes concentration tests. Concentrations tests alert risk management personnel when a client has purchased and excessive amount of a particular stock. The central Risk Server 114 collects drop copy notifications from all POP Sniffers 102 and therefore has a global view of trading (total stocks purchased an so on). If a concentration error occurs, the central Risk Server notifies all POP Sniffers 102 on-which the offending account is located. A "disable account" or "disable symbol" message is sent via RCP 1211, disabling the accounts ability to buy or sell that particular stock. These events are also recorded by the Risk Server 114 (application) and are forwarded to active risk consoles.

Autonomous and Slave mode—Another consideration is the application's ability to run autonomously. Using the ISP protocol 1211, all POP Sniffers 102 can maintain a local view of trading that allows the system to trade autonomously if connectivity to the Risk Server is lost. This will be achieved using a heuristic that will allow for limited trading thus minimizing the risk of service loss due to Risk Server 114 service loss. However, the primary mode of operation is in slave mode where the Risk Server 114 (application) makes most control decisions.

Distributed Configuration and Control (DCC) 1206. This module provides a database with critical configuration information for the entire Risk Management System 100. A key design goal of the System 100 is to provide a central database with all configuration information. The idea is that there is one and only one place to configure the system, on the Risk Server distributed registry, reducing the complexity or exposure to error cases less likely. When the system boots, the DCC 1206 fetches all configuration for that particular unit via the Configuration and Control Protocol, CP 1214. Once loaded, other subsystems can subscribe to this DCC 1206 to receive configuration information.

Session Management Layer 1227—The session layer 1227 provides a generic interface for all client/server protocols provided by the POP Sniffer unit 102. All protocols defined above are either client or server based. Servers listen for connections and clients initiate connections. Because these all have common characteristics, all protocols will utilize this common framework. Items such as authentication are enforced in this module and it is the only item sending or receiving data from/to the third Management Port 132.

The teachings of all patents, published applications and references cited herein are incorporated by reference in their entirety.

It will be understood that the example embodiments described above may be implemented in many different ways. In some instances, the various machines described herein are data processors. The such processor may be implemented by one or more physical or virtual general purpose computer having a central processor, memory, disk or other mass storage, communication interface(s), input/output (I/O) device(s), and other peripherals. The general purpose computer is transformed to perform the functions described, for example, by loading software instructions into the processor, and then causing execution of the instructions to carry out the functions.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Except where specifically stated above, the embodiments may therefore typically be implemented in hardware, firmware, software, or any combination thereof.

The computers that execute the functions described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

In certain embodiments, the procedures, devices, machines, servers, clients, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the nodes. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a first network interface configured to receive transaction information for a requested transaction from a client machine;
    processing logic configured to inspect the transaction information to determine compliance with two or more transaction risk rules requiring real time processing; and
    a second network interface configured to send the transaction information to at least one exchange server, wherein the first network interface and the second interface are coupled to each other; and
    wherein the second network interface begins sending at least part of the transaction information to the at least one exchange server at a time that is both:
        (a) prior to receiving all of the transaction information concerning the requested transaction from the client machine that originated the requested transaction, and
        (b) prior to completing the inspection of the transaction information to determine compliance with the two or more transaction risk rules requiring real time processing.

2. The system of claim 1 wherein transaction information received on the first network interface from the client machine is directly forwarded to the second network interface and then to the at least one exchange server.

3. The system of claim 1 wherein the first network interface and the second interface do not terminate a communication connection with either the client machine or the at least one exchange server.

4. The system of claim 1 wherein the processing logic, in inspecting the transaction information, is further configured to:
    determine that the requested transaction violates a rule; and
    in response to determining that the requested transaction violates the rule, alter the transaction information before completing the sending of the transaction information to the at least one exchange server.

5. The system of claim 1 wherein the transaction information is received as a packet and the processing logic, in inspecting the transaction information, is further configured to mark layer 2 error checking fields in the packet to a known erroneous value to indicate that that the requested transaction is not compliant with at least one transaction rule of the two or more transaction risk rules.

6. The system of claim 4 wherein altering the transaction information causes the requested transaction to fail at the at least one exchange server.

7. The system of claim 4 wherein the processing logic, in altering the transaction information, is further configured to mark the transaction information in a way that makes it either harmless economically or causes the at least one exchange server to reject the requested transaction.

8. The system of claim 4 wherein the transaction information is formed as a packet and the processing logic, in altering the transaction information, is further configured to modify one or more layer 2 portions of a packet storing the transaction information.

9. The system of claim 1 wherein the processing logic, in inspecting the transaction information, is further configured to:
determine that the requested transaction would violate a rule; and
in response determining that the requested transaction would violate a rule, disrupting a communication flow between the client machine that originated the requested transaction and the at least one exchange server.

10. The system of claim 1 wherein the transaction information is formed as a packet and wherein the processing logic, in inspecting the transaction information, is further configured to determine that the requested transaction violates a rule and alter the packet to prevent the packet from reaching the at least one exchange server.

11. The system of claim 1 wherein the transaction information is received and sent over the first network interface and the second network interface via a reliable or unreliable protocol including a Transmission Control Protocol/Internet Protocol (TCP/IP) or User Datagram Protocol/Internet Protocol (UDP/IP) protocol.

12. The system of claim 1 wherein a first network is utilized to connect the system to the client machine and a second network is utilized to connect to the system to the at least one exchange server.

13. The system of claim 1 wherein a fixed cut-through logic hardware device bridges between the first network interface and the second network interface.

14. A system comprising:
A hardware device configured to:
  receive transaction information concerning a requested transaction from a client machine via a first network interface,
  inspect the transaction information to determine compliance with a first rule type requiring minimal latency real time effort, and
  forward the transaction information to a processor;
the processor configured to determine compliance with a second rule type requiring only Best Effort; and
the hardware further configured to:
  send the transaction information to an exchange server via a second network interface such that sending of the transaction information to the exchange server begins at a time that occurs both
    (a) before all of the transaction information concerning the requested transaction is received from the client machine, and
    (b) before the step of determining compliance with any of the first rule type using the fixed logic hardware is completed.

15. The system of claim 14 wherein the hardware device is a Field Programmable Gate Array (FPGA).

16. The system of claim 14 wherein the transaction information is formed as a packet and the processing logic is further configured to alter one or more layer 2 symbols in the packet when the transaction information does not comply with the first rule type.

17. The system of claim 14 wherein the processing logic, in inspecting the transaction information, is further configured to:
determine that the transaction information is not compliant with the first type of rule; and
alter a packet containing at least a part of the transaction information to prevent the packet from reaching the exchange server.

18. A system comprising:
a hardware device including:
  a first network interface configured to receive transaction information concerning a requested transaction from a client machine;
  processing logic configured to inspect the transaction information to determine compliance with one or more transaction risk rules to produce inspected transaction information;
  a second network interface configured to send the transaction information to an exchange server, wherein at least part of the inspected transaction information reaches the exchange server:
    (a) before all of the transaction information concerning the requested transaction is received from the client machine, and
    (b) before inspection of the transaction information to determine compliance with any of the one or more transaction rules is completed; and
  a third network interface configured to send a copy of the inspected transaction information to a different processing system.

19. The system of claim 18 wherein the third network interface is a connection to a sponsoring broker system for the requested transaction, and the third network interface, in sending the copy, is further configured to send a stream of transaction event updates independent of the sponsoring broker system.

20. The system of claim 18 wherein the third network interface is a connection to a client device, and the third network interface, in sending a copy, is further configured to send a stream of transaction event updates to the client device.

* * * * *